(12) United States Patent
Guenther

(10) Patent No.: US 8,204,629 B2
(45) Date of Patent: Jun. 19, 2012

(54) CONTROL DEVICE FOR LUBRICATION SYSTEMS

(75) Inventor: Armin Guenther, Hermstadt-Bargen (DE)

(73) Assignee: Lincoln GmbH, Walldorf (DE)

( * ) Notice: Subject to any disclaimer, the term of this patent is extended or adjusted under 35 U.S.C. 154(b) by 360 days.

(21) Appl. No.: 12/601,048

(22) PCT Filed: Apr. 23, 2008

(86) PCT No.: PCT/EP2008/003243
§ 371 (c)(1),
(2), (4) Date: Nov. 20, 2009

(87) PCT Pub. No.: WO2008/145235
PCT Pub. Date: Dec. 4, 2008

(65) Prior Publication Data
US 2010/0161142 A1    Jun. 24, 2010

(30) Foreign Application Priority Data
May 25, 2007   (DE) .................. 20 2007 007 549 U

(51) Int. Cl.
*G05D 11/00* (2006.01)
*G06F 17/00* (2006.01)
*G06F 15/00* (2006.01)
*F01M 1/00* (2006.01)
*H02B 1/26* (2006.01)
*H02B 1/01* (2006.01)
*F01M 9/00* (2006.01)
*F01M 3/00* (2006.01)
*F01M 1/18* (2006.01)
*F01M 1/04* (2006.01)
*F16N 13/20* (2006.01)

(52) U.S. Cl. .............. 700/283; 184/6; 184/6.1; 184/6.2; 184/6.3; 184/6.4; 184/6.5; 184/26; 184/33; 361/622; 361/627; 700/90; 712/25; 712/30; 712/32; 712/36

(58) Field of Classification Search ............... 184/6–6.5, 184/26, 33, 109; 712/25, 30, 32, 36; 700/90, 700/283; 361/622, 627
See application file for complete search history.

(56) References Cited

U.S. PATENT DOCUMENTS
3,775,756 A * 11/1973 Balser ........................ 712/32
(Continued)

FOREIGN PATENT DOCUMENTS
EP     1167832 A2 *  1/2002
(Continued)

OTHER PUBLICATIONS
"Centro-Matic Automated Lubrication Systems" Lincoln Industrial, brochure, 2001, 7 pages.*
(Continued)

*Primary Examiner* — John R. Cottingham
*Assistant Examiner* — Thomas Stevens
(74) *Attorney, Agent, or Firm* — Senniger Powers LLP

(57) ABSTRACT

The invention relates to a control device for lubrication systems, having a control processor which is arranged in a housing, having connections, which are formed on the housing, for sensor inputs and control outputs, which are connected to the control processor, and having an operator interface which is secured to the outside of the housing and is intended to input control parameters. Provision is made for the control processor to be set up with different control programs for different lubrication systems and for program switches for selecting the different control programs to be arranged inside the housing.

13 Claims, 1 Drawing Sheet

U.S. PATENT DOCUMENTS

| | | | | |
|---|---|---|---|---|
| 4,120,583 A | * | 10/1978 | Hyatt | 355/86 |
| 4,326,603 A | * | 4/1982 | Darrow et al. | 184/6.1 |
| 4,434,390 A | * | 2/1984 | Elms | 318/473 |
| 4,445,168 A | * | 4/1984 | Petryszyn | 700/21 |
| 4,454,596 A | * | 6/1984 | Wunsch et al. | 361/679.21 |
| 4,604,699 A | * | 8/1986 | Borcherdt et al. | 702/15 |
| 4,674,030 A | * | 6/1987 | Gabriel et al. | 700/79 |
| 4,787,481 A | * | 11/1988 | Farrar et al. | 187/247 |
| 4,862,379 A | * | 8/1989 | Fujimoto | 700/169 |
| 5,125,480 A | * | 6/1992 | Gregory et al. | 184/6.26 |
| 5,182,720 A | * | 1/1993 | Beck et al. | 700/282 |
| 5,189,624 A | * | 2/1993 | Barlow et al. | 700/169 |
| 6,216,822 B1 | * | 4/2001 | May et al. | 184/105.1 |
| 6,609,070 B1 | * | 8/2003 | Lueck | 702/50 |
| 6,886,606 B2 | * | 5/2005 | Few et al. | 141/65 |
| 6,912,427 B1 | * | 6/2005 | Pattee et al. | 700/13 |
| 2003/0052643 A1 | * | 3/2003 | Sweo | 318/801 |
| 2007/0050096 A1 | | 3/2007 | Mattes | |

FOREIGN PATENT DOCUMENTS

| | | | |
|---|---|---|---|
| JP | 08175497 A | * | 7/1996 |
| WO | 9213300 A1 | | 8/1992 |

OTHER PUBLICATIONS

International Preliminary Report on Patentability issued Dec. 1, 2009 regarding PCT/EP2008/003243, 22 pages.

* cited by examiner

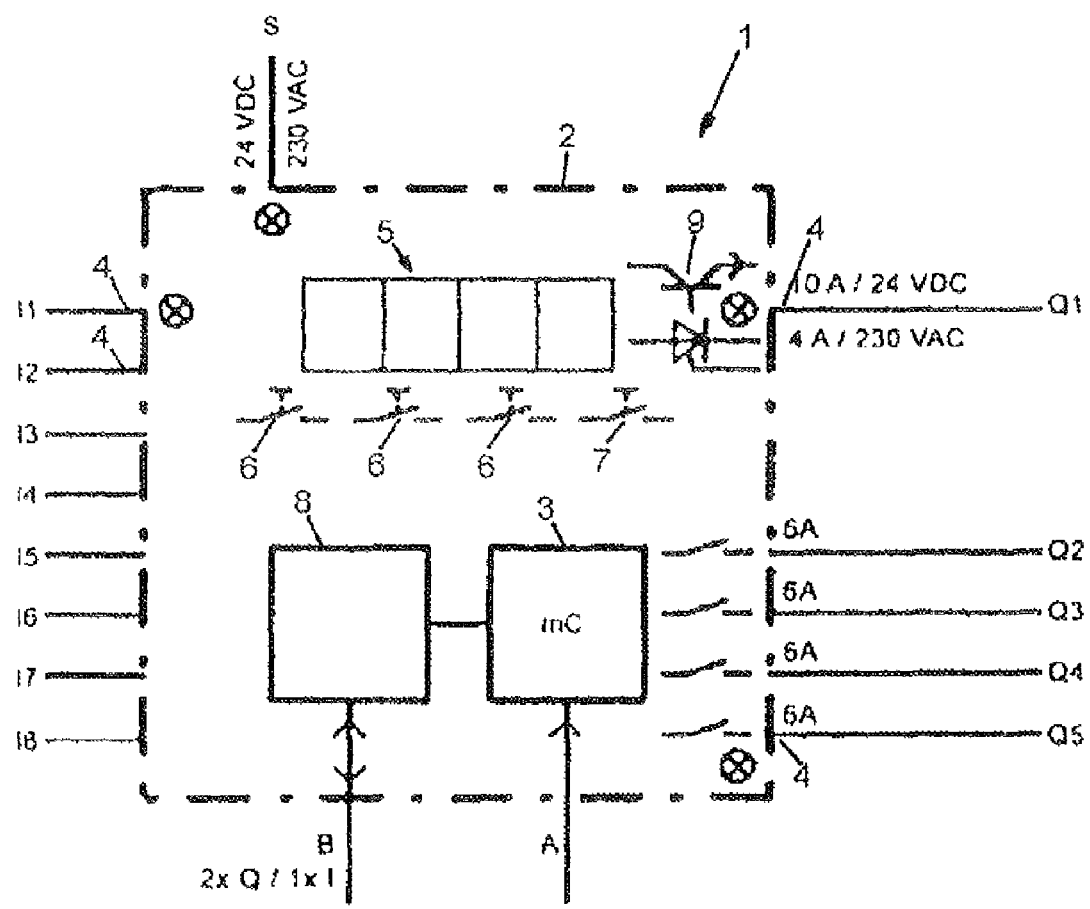

CONTROL DEVICE FOR LUBRICATION SYSTEMS

FIELD OF THE INVENTION

The invention pertains to a control device for lubrication systems with a control processor that is arranged in a housing, wherein the housing features terminals for sensor inputs and control outputs that are connected to the control processor, and wherein an operator interface for inputting control parameters is fixed on the outside of the housing.

BACKGROUND OF THE INVENTION

Control devices of this type that are adapted to a special lubrication system are frequently utilized in practical applications for controlling and monitoring lubrication systems in technical facilities such that the desired lubricating effect is achieved. It is possible, for example, to determine the state of the facility or a lubricating requirement by means of sensors and to supply certain locations of the facility with lubricants by means of actuators that are connected to the control output and consist, for example, of pumps, valves or the like.

SUMMARY OF THE INVENTION

In control devices known so far, it is a disadvantage that a specially designed control device needs to be used for each lubrication system. This is why the control devices cannot be readily replaced in case of need. This complicates the set-up of new lubrication systems and increases expenditures for maintenance and servicing.

The invention is therefore based on the objective of proposing a compact multifunctional control device that can be configured for different lubrication systems and that enables reliably controlling the system without allowing the danger of an undesirable reconfiguration during the operation thereof.

In general this invention is directed to a control device for lubrication systems. The control device comprises a control processor that is arranged in a housing comprising terminals for sensor inputs and control outputs that are connected to the control processor. An operator interface for inputting control parameters is fixed on the outside of the housing. The control processor is set up with different control programs for different lubrication systems, and program switches for selecting the different control programs are arranged within the housing.

Other characteristics, advantages and possible applications of the invention result from the following description of an embodiment and the drawing. In this respect, all described and/or graphically illustrated characteristics form the object of the present invention individually or in arbitrary combinations, irrespective of their combination in the claims or their references to other claims.

BRIEF DESCRIPTION OF THE DRAWING

FIG. 1 shows schematically the design of the control device with essential components of the invention.

DETAILED DESCRIPTION

FIG. 1 shows a control device 1 with a housing 2 that is schematically indicated in the form of a dot-dash line and in which a control processor 3 is arranged. The housing 2 is provided with externally accessible terminals 4 for a sensor input I1 to I8 and a control output Q1 to Q5 that are respectively connected to the control processor 3. The sensor inputs I can be selectively read by the control processor 3 and the control outputs Q can be selectively switched by the control processor 3.

The control device 1 furthermore features an operator interface 5 that is fixed on the outside of the housing and connected to the control processor 3, wherein said operator interface contains, in particular, not-shown input and display units. The operator interface 5 serves for inputting control parameters of the control device 1 that is preset for a certain lubrication system.

For this purpose, the control processor 3 is set up with different control programs for different lubrication systems for which the control device 1 and the control processor 3 are designed, wherein these control programs are stored in an internal memory. Three program (selection) switches 6 for selecting different control programs according to the lubrication system connected to the control device 1 are arranged in the interior of the housing 2 of the control device 1 such that they are not accessible while the housing 2 is closed during normal operation of the system. The program switches 6 are respectively connected to the control processor 3, which is realized, for example, in the form of a microcontroller, and are simply arranged on a common circuit board situated in the housing 2 together with the control processor 3 as well as the electronic components of the terminals 4 and if applicable, the operator interface 5.

The program switches 6 are realized in the form of so-called DIP switches that respectively have two settings such that a total of eight different switch settings can be realized with the three switches for different control programs. These switch settings of the program switches 6 can be read by the control processor 3.

In order to prevent the control processor 3 from also directly reading the program switches 6 during changeover of the program switches 6 and from selecting a control program in accordance with the setting of the program switches, a configuration switch 7, which is also realized in the form of a DIP switch and has two different switch settings, is additionally provided in the housing 2 of the control device 1. The first switch setting corresponds to an operating mode, and the second switch setting corresponds to a reset mode in which the control processor 3 reads the switch setting of the program switches 6 and activates the corresponding control program.

In order to adjust parameters that should never be changed during operation of the control device 1, the control processor 3 is realized in such a way that it activates a control program for parameter presetting, in which certain parameters of the lubricating system to be selected can be input by means of the operator interface 5, in one setting of the program switches 6; for example, when all program switches 6 are switched on. The respective parameters are assigned an ID number that subsequently is appropriately interpreted by the control processor 3 in accordance with the selected lubrication system.

The universal control device 1 therefore serves in particular for controlling and monitoring stationary lubrication systems such as progressive systems, spraying systems, two-line systems, Centro-Matic systems, PMA-systems and/or COBRA chain lubrication systems of the type offered by the applicant of the utility model. However, the universal control device 1 is basically suitable for any type of lubrication system in which certain states of the lubrication system are monitored by means of sensors and certain control commands for actuators are issued at a control output Q.

In order to also adapt the control device subsequently to modified or new types of lubrication systems, the control processor 3 features a programming input A that can be realized, for example, in the form of a cable or infrared connection, and that makes it possible to reprogram the control processor 3 and to store new control program versions in its memory.

The control processor 3 may furthermore be connected to a bus coupler 8 that is also connected to the control processor 3 and features a bus interface B such that the control device 1 can also be connected to suitable bus systems.

The terminals 4 of the sensor inputs I1 to I8 respectively feature three contacts for a sensor, wherein 2-wire or 3-wire sensors can be connected. In this case, 3-wire sensors are supplied with a supply voltage up to 24 V.

The terminals 4 for control output feature an electronic output (Q1) that can be switched by means of a transistor 9, and that respectively allows a current of 10 A at an output voltage of 24 VDC and a current flow of 4 A at an output voltage of 230 VAC in order to control actuators connected to the control device 1. Furthermore, four relay interfaces Q2 to Q5 are provided in order to realize a control with direct or alternating current up to 6 A. Depending on requirements, it is also possible to correspondingly adapt the existing terminals 4 of the sensor input I and the control output Q.

The control device 1 furthermore features a voltage supply terminal S that makes it possible to supply the control device 1 with a direct current of 24 V or an alternating current of 230 V, depending on the respective version.

The above-described control device 1 consequently is particularly suitable as a universal control device for different types of lubrication systems, wherein the type of lubrication system can be adjusted by means of program switches 6 in the interior of the housing 2 of the control device 1 during the installation of the control device 1, but cannot be readjusted from the operator interface 5 during the normal operation. A high system and operational reliability can be achieved in this fashion.

It will be apparent from the foregoing that the objectives of this invention are attained using a control device having a control processor that is arranged in a housing. The housing has terminals for sensor inputs and control outputs that are connected to the control processor. An operator interface for inputting control parameters is fixed on the outside of the housing. The control processor is set up with different control programs for different lubrication systems. Program switches for selecting the different control programs are arranged within the housing. Multi-functionality of the control for a variety of even specialized lubrication systems is achieved, in principle, by pre-configuring the control processor with control programs that are adapted to potential lubrication systems. A reliable operation of the lubrication system is ensured due to the fact that the adaptation of the control program to a certain lubrication system and the adjustment of the basic parameters of this system are not realized with the operator interface that is fixed on the outside of the housing and operated from this location. Rather the control device is protected from accidental actuation because the program switches for selecting the different control programs are arranged within the housing, which is closed during normal operation. An accidental operating error during operation is therefore precluded because the housing needs to be opened for a reconfiguration. The program switch(es) may consist, for example, of DIP switches that are directly arranged on a control circuit board, wherein the number of program switches is chosen in accordance with the selectable control variations for the different systems. It is particularly advantageous to provide three DIP switches that can be set to two positions in order to select different systems, such that a total of eight different configurations can be realized. However, the invention is not limited to the above-described number of program switches, which can be suitably chosen by a person skilled in the art in accordance with the respective requirements.

It is particularly advantageous to provide, in addition to the program (selection) switches, a configuration switch for accepting the selection made at the program switches or switch in the housing. In its first setting, this switch that, for example, is also realized in the form of a DIP switch, switches control from an operating mode into a reset mode in which the control processor is, if applicable, set to a defined initial state and readout of the settings of the program switches by the control processor is initiated. The control device is set back to the operating mode in this case with the control program adjusted with the program switches by being switched over once again. The additional actuation of a separate switch for reading out and for accepting the setting of the program switches at the control processor of the control device represents an additional safety component, since not only the setting of the program switches needs to be changed, but the readout of the new switch settings also needs to be purposefully activated in order to adopt new program data.

In order to realize certain system-specific or general parameter presettings, one preferred embodiment of the inventive control device proposes that a defined setting of the program switches serves for a parameter presetting, by means of which typical lubrication system configurations are adjusted that are no longer changed during operation because they serve for the basic parameterization of the device. In this defined setting of the program selection switches, for example, the operator interface for inputting control parameters that is fixed on the outside of the housing can be set into a special input mode in which only certain basic parameters can be adjusted. If the setting of the program switches is changed, this program cannot be called up for presetting the parameters at the operator interface. The reliability in configuring the control device is additionally improved due to this inventive coupling of an input procedure stored in the control processor with a predetermined setting of the program switches.

According to one aspect of the invention, the control processor can be designed, in particular, for adjusting the parameters of stroke monitoring, distributor, revolution counter, distribution monitoring, pressure switch, time adjustment and/or timing. For this purpose, an identifier such as, for example, an ID number can be assigned to each adjustable parameter of a lubrication system, wherein the control processor interprets each of these numbers differently depending on the optional subsequent selection of the lubrication system. The meaning of the individual identifiers can be listed, for example, in operating instructions or retrieved from the memory of the control processor by means of a help menu for the pre-configured lubrication systems, and then displayed on a display of the operator interface.

In one preferred embodiment of the control device according to the invention, the terminals for the sensor input and the terminals for the control output can be interpreted and controlled by the control processor as a function of the setting of the program switches. This allows a simple connection of different sensors and actuators to the terminals of the control device according to the lubrication system to be controlled.

In addition to the parameter presetting and the selection of the lubrication system that, according to the invention, can only be realized by actuating the program switches arranged within the housing, an adjusting mode for selecting special parameters can be activated at the operator interface, particularly with the aid of a menu, wherein the adjusting mode is pre-configured by the control processor as a function of the setting of the program switches. This makes it possible to adjust parameters of the selected lubrication system that change during operation.

The control processor is preferably designed for adjusting the parameter monitoring time, idle time, lubricating time, turn-off delay, nipple cleaning time, lubrication/revolution/stroke number, idle speed and/or number of chain links by means of the operator interface according to the selected lubrication system. These parameters make the control processor suitable for all important types of lubrication systems, wherein other parameters can also be adjusted, if so required, by reprogramming the control processor.

According to the invention, all adjustments and meter data resulting during the configuration of a lubrication system and the operation of the lubrication system are stored in a non-volatile memory (e.g., an EEPROM) of the control device at short predetermined intervals (for example, every 30 minutes) such that they are not lost in case of a power failure and are immediately available for the continued operation of the system after the power supply is restored.

The inventive control device features its own energy supply in the form of a DC power supply or an AC power supply such that an inventive control device can be integrated into nearly any existing electrical supply system of a lubrication system by appropriately selecting the version of the control device with the suitable energy supply.

According to one particularly preferred embodiment of an inventive control device, the terminals for the sensor input respectively feature three contacts for a sensor, to which 2- or 3-wire initiators can be selectively connected. The terminals can be suitable, in particular, for 3-wire initiators up to 24 V (PNP) and 2-wire initiators with a residual voltage <5 V. This covers the spectrum of typical sensors used in lubrication systems.

The terminals of the control device for the control output preferably feature at least one electronic output and at least one relay output, particularly an electronic output and four relay outputs for variably connecting different actuators that have different requirements with respect to the current flow and/or the switching frequency.

LIST OF REFERENCE SYMBOLS

| | |
|---|---|
| 1 | Control device |
| 2 | Housing |
| 3 | Control processor |
| 4 | Terminal |
| 5 | Operator interface |
| 6 | Program switch |
| 7 | Configuration switch |
| 8 | Bus coupler |
| A | Programming input |
| B | Bus interface |
| I | Sensor input |
| Q | Control output |
| S | Voltage supply terminal |

The invention claimed is:

1. A control device for lubrication systems, said control device comprising a control processor that is arranged in a housing, wherein the housing comprises terminals for sensor inputs and control outputs that are connected to the control processor, and wherein an operator interface for inputting control parameters is fixed on the outside of the housing, characterized in that the control processor is set up with different control programs for different lubrication systems, and in that program switches for selecting the different control programs are arranged within the housing.

2. The control device according to claim 1, characterized in that a configuration switch for accepting a selection preset by means of the program switches is provided in the housing.

3. The control device according to claim 1, characterized in that one position of the program switches serves for a presetting of parameters.

4. The control device according to claim 3, characterized in that the parameter presetting can be carried out by means of the operator interface.

5. The control device according to claim 3, characterized in that the control processor is designed for adjusting parameters of stroke monitoring, distributor, revolution counter, distribution monitoring, pressure switch, time adjustment and/or timing when the program switches are positioned for parameter presetting.

6. The control device according to claim 1, characterized in that the terminals for the sensor input and the terminals for the control output can be interpreted and controlled by the control processor as a function of a position of the program switches.

7. The control device according to claim 1, characterized in that an adjusting mode for selecting special parameters can be activated at the operator interface, wherein said adjusting mode is pre-configured as a function of a position of the program switches.

8. The control device according to claim 1, characterized in that the control processor is designed for adjusting parameters monitoring time, idle time, lubricating time, turn-off delay, nipple cleaning time, lubrication/revolution/stroke number, idle speed and/or number of chain links by means of the operator interface according to a selected lubrication system.

9. The control device according to claim 1, characterized in that an energy supply of the control device consists of a direct current power supply or an alternating current power supply.

10. The control device according to claim 1, characterized in that the terminals for the sensor input respectively compromise three contacts for a sensor, to which two-wire or three-wire initiators can be selectively connected.

11. The control device according to claim 1, characterized in that the terminals for the control output comprise at least one electronic output and at least one relay output.

12. The control device according to claim 2, characterized in that one position of the program switches serves for a presetting of parameters.

13. The control device according to claim 4, characterized in that the control processor is designed for adjusting parameters of stroke monitoring, distributor, revolution counter, distribution monitoring, pressure switch, time adjustment and/or timing when the program switches are positioned for parameter presetting.

* * * * *